(12) United States Patent
Tan (10) Patent No.: US 10,674,091 B2
(45) Date of Patent: Jun. 2, 2020

(54) IMAGE PROCESSING METHOD BASED ON DETERMINATION OF LIGHT SPOT AREA AND RELATED PRODUCTS

(71) Applicant: GUANGDONG OPPO MOBILE TELECOMMUNICATIONS CORP., LTD., Dongguan, Guangdong (CN)

(72) Inventor: Guohui Tan, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 130 days.

(21) Appl. No.: 15/898,635

(22) Filed: Feb. 18, 2018

(65) Prior Publication Data

US 2018/0352132 A1  Dec. 6, 2018

(30) Foreign Application Priority Data

May 31, 2017  (CN) .......................... 2017 1 0401771

(51) Int. Cl.
*H04N 5/235* (2006.01)
*H04N 5/232* (2006.01)
*G06T 5/00* (2006.01)
*H04N 5/262* (2006.01)
(Continued)

(52) U.S. Cl.
CPC .......... *H04N 5/2351* (2013.01); *G06T 5/002* (2013.01); *G06T 5/008* (2013.01); *G06T 7/11* (2017.01); *H04N 1/6086* (2013.01); *H04N 5/23232* (2013.01); *H04N 5/2621* (2013.01)

(58) Field of Classification Search
None
See application file for complete search history.

(56) References Cited

U.S. PATENT DOCUMENTS

2008/0158410 A1* 7/2008 Lin ........................ H04N 5/235
348/364
2009/0073287 A1 3/2009 Shimizu et al.
(Continued)

FOREIGN PATENT DOCUMENTS

CN 103366352 A 10/2013
CN 104301624 A 1/2015
(Continued)

OTHER PUBLICATIONS

Chinese Patent Application No. 201710401771.5, Office Action dated Apr. 18, 2019, 10 pages.
(Continued)

*Primary Examiner* — Cynthia Segura
(74) *Attorney, Agent, or Firm* — Lathrop GPM LLP (57) ABSTRACT

An image processing method and relative products are provided. The image processing method may include: acquiring an image to be processed when shooting a picture; acquiring N shooting brightness parameters for adjusting a camera corresponding to the shooting, where N is a positive integer; determining a current environment according to the N shooting brightness parameters; determining a light spot area of the image to be processed according to the current environment; and performing different processing operations on the light spot area and other areas of the image to be processed, so as to acquire an output image.

14 Claims, 7 Drawing Sheets

(51) Int. Cl.
  *G06T 7/11* (2017.01)
  *H04N 1/60* (2006.01)

(56) References Cited

U.S. PATENT DOCUMENTS

| | | | |
|---|---|---|---|
| 2010/0231748 A1* | 9/2010 | Takeda | G03B 5/00 |
| | | | 348/229.1 |
| 2012/0320230 A1 | 12/2012 | Uehara | |
| 2013/0022289 A1* | 1/2013 | Umeda | G06T 5/002 |
| | | | 382/274 |
| 2016/0117803 A1 | 4/2016 | Ueyama | |
| 2016/0127655 A1 | 5/2016 | Li et al. | |
| 2016/0255291 A1 | 9/2016 | Isobe | |
| 2016/0261781 A1* | 9/2016 | Chen | H04N 5/23219 |
| 2016/0328827 A1 | 11/2016 | Ilic et al. | |
| 2017/0014029 A1 | 1/2017 | Azizian et al. | |
| 2017/0019582 A1* | 1/2017 | Lv | H04N 5/23212 |
| 2017/0109830 A1 | 4/2017 | Macciola et al. | |

FOREIGN PATENT DOCUMENTS

| | | |
|---|---|---|
| CN | 104463787 A | 3/2015 |
| CN | 104853082 A | 8/2015 |
| CN | 105574866 A | 5/2016 |
| CN | 106504220 A | 3/2017 |
| CN | 106534696 A | 3/2017 |
| CN | 106651823 A | 5/2017 |
| CN | 107197146 A | 9/2017 |
| JP | 2011160274 A | 8/2011 |
| TW | I425831 B | 2/2014 |
| WO | WO 2017084075 A1 | 5/2017 |

OTHER PUBLICATIONS

Chinese Patent Application No. 201710401771.5, English translation of Office Action dated Apr. 18, 2019, 12 pages.
Taiwan Patent Application No. 106144258, Office Action dated Oct. 18, 2018, 8 pages.
European Patent Application No. 18161908.1, extended Search and Opinion dated Nov. 6, 2018, 7 pages.
PCT/CN2018/084280 English Translation of the International Search Report and Written Opinion dated Jul. 13, 2018, 11 pp.

* cited by examiner

IMAGE PROCESSING METHOD BASED ON DETERMINATION OF LIGHT SPOT AREA AND RELATED PRODUCTS

CROSS-REFERENCE TO RELATED APPLICATIONS

This application is based on and claims priority of Chinese Patent Application No. 201710401771.5, filed on May 31, 2017, the entire contents of which are incorporated herein by reference.

TECHNICAL FIELD

The present disclosure relates to an image processing and electronic device technology field, and more particularly relates to an image processing method, and related products.

BACKGROUND

With a rapid development of information technology, a mobile terminal such as a mobile phone or a tablet has been popularized, and requirements for the mobile terminal of users have been raised highly, especially for shooting function of the mobile terminal.

In prior art, an effect same as real optical blur may be obtained by performing a special processing on light spots using some bokeh algorithms. However, in a process of bokeh, some highlighted objects are considered mistakenly as light spots and being subject to the same processing operations as the light spots at the same time. This will lead to a lack of details of the highlighted objects and reduce a displaying effect of an output image.

SUMMARY

Embodiments of the present disclosure provide an image processing method, and related products.

A first aspect of embodiments of the present disclosure provides an image processing method. The image processing method may include: acquiring an image to be processed when shooting a picture; acquiring N shooting brightness parameters for adjusting a camera and corresponding to the shooting, where N is a positive integer; determining a current environment according to the N shooting brightness parameters; determining a light spot area of the image to be processed according to the current environment; and performing different processing operations on the light spot area and other areas of the image to be processed, so as to acquire an output image.

A second aspect of embodiments of the present disclosure provides a mobile terminal. The mobile terminal may include: a shooting unit, configured to acquire an image to be processed when shooting a picture; an acquiring unit, configured to acquire N shooting brightness parameters for adjusting a camera and corresponding to the shooting, where N is a positive integer; a first determining unit, configured to determine a current environment according to the N shooting brightness parameters; a second determining unit, configured to determine a light spot area of the image to be processed according to the current environment; and a processing unit, configured to perform different processing operations on the light spot area and other areas of the image to be processed, so as to acquire an output image.

A third aspect of embodiments of the present disclosure provides a mobile terminal. The mobile terminal may include a processor, a memory and one or more programs stored on the memory, when the one or more programs are executed by the processor, the one or more programs are configured to perform following acts: acquiring an image to be processed when shooting a picture; acquiring N shooting brightness parameters for adjusting a camera and corresponding to the shooting, where N is a positive integer; determining a current environment according to the N shooting brightness parameters; determining a light spot area of the image to be processed according to the current environment; and performing different processing operations on the light spot area and other areas of the image to be processed, so as to acquire an output image.

A fourth aspect of embodiments of the present disclosure provides an image processing apparatus. The image processing apparatus has functions for realizing behaviors of the mobile terminal corresponding to the method described in the first aspect. The functions may be realized by hardware or corresponding software executed by the hardware. The hardware or the software may include one or more modules corresponding to the above functions.

A fifth aspect of embodiments of the present disclosure provides a computer readable storage medium having computer programs for exchanging digital data stored thereon, in which the computer programs are executed to cause a computer to perform all or a part of acts of the image processing method according to the first aspect of embodiments of the present disclosure.

BRIEF DESCRIPTION OF THE DRAWINGS

In order to make the technical solutions of embodiments of the present invention more clearly, the accompanying drawings used in the description of embodiments of the present invention are briefly described hereunder. Obviously, the described drawings are merely some embodiments of present invention. For persons skilled in the art, other drawings may be obtained based on these drawings without any creative work.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Terms such as "first", "second", "third", "fourth" and the like used in the specification, in claims and in drawings are configured herein for distinguishing different subjects, but not for showing a particular sequence. Furthermore, the terms such as "include", "comprise" and any other variations thereof are intended to be non-exclusive. For example, a process, a method, a system, a product or a device including or comprising a sequence of blocks or units is not limited to include or comprise the listed blocks or unit, instead, they alternatively further include or comprise other blocks and units that are not listed or alternatively further include inherent blocks or units of the process, the method, the system, the product or the device.

Term such as "embodiments" referred in the present disclosure means that, particular features, structures and characteristics described in combination with embodiments may be included in at least one embodiment of the present disclosure. Usages of the term for many times in the specification are not necessary to refer to a same embodiment or same embodiments, and they are not independent embodiments mutually exclusive with other embodiments or unimportant embodiments. It may be explicitly or implicitly understood by those skilled in the art that embodiments described herein can be combined with other embodiments.

The mobile terminal described according to embodiments of the present disclosure may include but is not limited to a smart phone such as a mobile phone with Android system, iOS system, windows system and the like, a tablet computer, a palm computer, a laptop, a mobile internet device or a wearable device and the like, which are merely exemplary but no exhaustive.

In embodiments of the present disclosure, the shooting brightness parameters are configured to adjust the shooting brightness of a camera when shooting a picture. The shooting brightness parameters may include an exposure time, an ISO value and a luminous flux. The exposure time is a time interval from turning-on of a shutter to turning-off of the shutter, during which an image of an object can be left on a photographic film. The ISO value represents a sensitivity of light with numbers, the higher the ISO value is, the greater the sensitivity of light is. A high ISO value is suitable for shooting under low light conditions and for shooting moving objects, but the resulting image may include noisy points and excessive film grain. On the contrary, a low ISO value may be unsuitable for shooting under low light conditions and for shooting moving objects, but the resulting image may be exquisite. The luminous flux is an output flux of a radiation flux evaluated according to an international standard Human Vision System. In detail, the luminous flux refers to radiant power sensible by human eyes, equaling to a product of radiant power of a certain wave band within a unit interval and a relative vision rate of this wave band. As the relative vision rates of human eyes for lights with different wave lengths are different, the luminous fluxes of lights with different wave lengths may be different even when the lights with different wave lengths have the same radiant power. In a high light environment, the luminous flux is low, and in a low light environment, the luminous flux is high. In a process of shooting, the luminous flux may reflect a brightness level of the environment to a certain extent. Take the exposure time and the ISO value as an example.

Generally, when the mobile terminal is shooting a picture, an auto-adjustment can be realized, and different exposure time and ISO values can be obtained in different cases. Therefore, the exposure time and ISO value may be related to environments of shooting to a certain extent. In addition, the exposure time and the ISO value reflecting the environments from two different dimensions may be acquired by a number of experiments. Generally, light spots are easily to be formed when shooting against the light.

Further, in embodiments of the present disclosure, a first preset environment and a second preset environment are two independent environments. The first preset environment may be understood as a high light environment, and the second preset environment may be understood as a low light environment. The manner for identifying the light spots and the highlighted objects in the high light environment may be different from that in the low light environment. Accordingly, embodiments of the present disclosure process the highlighted objects and the light spots for such two environments, so as to improve the displaying effect of the image.

Figure 1:
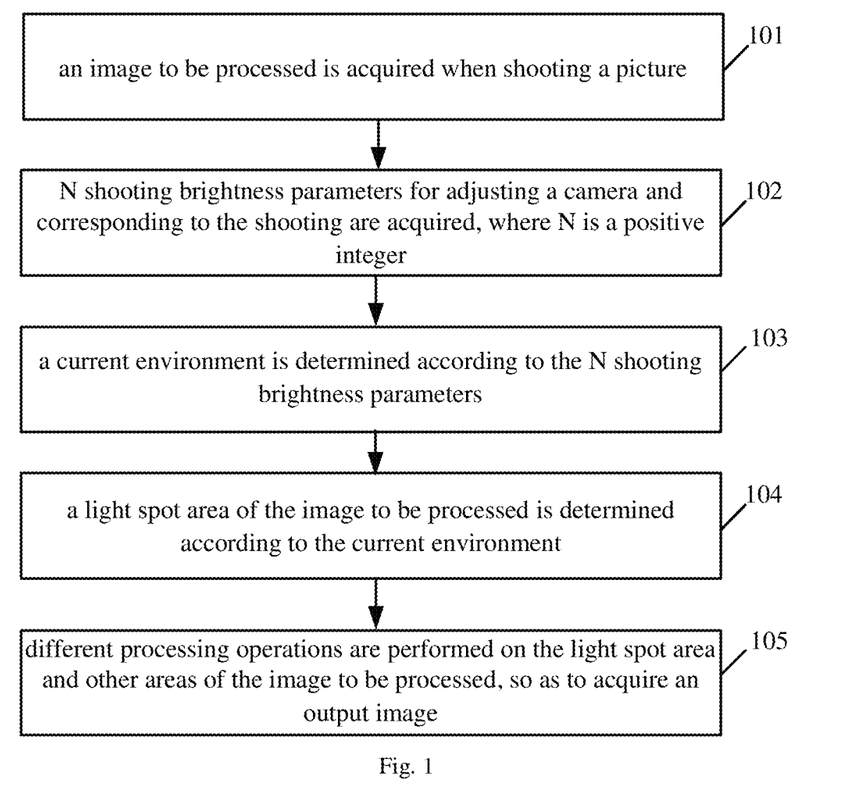
FIG. 1 is a schematic flow chart of an image processing method according to an embodiment of the present disclosure.

Referring to FIG. 1, FIG. 1 is a schematic flow chart of an image processing method according to an embodiment of the present disclosure. The image processing method may include the following.

At block 101, an image to be processed is acquired when shooting a picture.

A mobile terminal may shoot the picture when receiving a shooting instruction, so as to acquire the image to be processed. The image to be processed in block 101 may be stored in background of the mobile terminal, which is not displayed to the user, in other words, the user is unable to view the image to be processed.

At block 102, N shooting brightness parameters for adjusting a camera and corresponding to the shooting are acquired, where N is a positive integer.

The mobile terminal may acquire N shooting brightness parameters when performing an act at block 101, in which N is a positive integer. The N shooting brightness parameters may include, for example, an exposure time and an ISO value. The N shooting brightness parameters are already acquired by the mobile terminal when the image to be processed is acquired, thus, the N shooting brightness parameters may be obtained directly.

At block 103, a current environment is determined according to the N shooting brightness parameters.

As the N shooting brightness parameters are acquired during the shooting, the N shooting brightness parameters may laterally reflect the current environment.

In an embodiment, the N shooting brightness parameters include an exposure time and an ISO value, and determining the current environment according to the N shooting brightness parameters at block S103 may include: A1), determining the current environment as a first preset environment when the exposure time is smaller than a first preset threshold and the ISO value is smaller than a second preset threshold; and A2), determining the current environment as a second preset environment when the exposure time is greater than or equal to the first preset threshold or when the ISO value is greater than or equal to the second preset threshold.

The first preset threshold and the second preset threshold may be default settings of the system or may be set by the user. For example, the first preset threshold may be 10 ms, and the second preset threshold may be 200. When the exposure time is smaller than 10 ms and the ISO value is smaller than 200, the current environment may be considered as the first preset environment; otherwise, the current environment may be considered as the second preset environment. For another example, the first preset threshold may be 15 ms, and the second preset threshold may be 185. When the exposure time is smaller than 15 ms and the ISO value is smaller than 185, the current environment may be considered as the first preset environment; otherwise, the current environment may be considered as the second preset environment. Thus, the environment may be distinguished using the exposure time and the ISO value, thus facilitating the processing of light spots for different environments.

In an embodiment, the image processing method may further include the following between block 102 and 103: dividing the image to be processed into P independent areas, and selecting Q independent areas from the P independent areas. A mean brightness of each of the Q independent areas is greater than a preset mean brightness, where P and Q are positive integers and P is greater than Q.

Further, determining the current environment according to the N shooting brightness parameters in block 103 may include: B1), determining a discrete distribution degree of the Q independent areas in the image to be processed; and B2), determining the current environment according to the discrete distribution degree of the Q independent areas and the N shooting brightness parameters.

P and Q may be default settings or may be set by the user. The mobile terminal may divide the image to be processed into P independent areas as follows. By an image segmentation or in a geometric manner, the image to be processed may be divided into areas with same shape and size. For example, the image to be processed may be divided into the nine-rectangle-grid. The preset mean brightness may be a system default setting or may be set by the user. As the light spots are usually obtained when shooting against light, the light spots may be concentrated to a certain extent. Therefore, the discrete distribution degree of the Q independent areas in the image to be processed may be determined, and the current environment may be determined according to the discrete distribution degree of the Q independent areas and the N shooting brightness parameters. Therefore, the accuracy of determining the environment may be improved.

Further, determining the discrete distribution degree of the Q independent areas in the image to be processed described in B1) may include: B11), mapping the image to be processed into a plane coordinate system according to a preset manner, selecting a geometric center of each of the Q independent areas so as to acquire Q geometric center points; B12), acquiring a geometric center of the Q geometric center points so as to acquire a target center geometric point; and B13), determining standard deviations between the Q geometric center points and the target center geometric point so as to acquire the discrete distribution degree.

The preset manner will be explained as follows. By taking a vertex or a center of the image to be processed as an origin of the coordinates, the image to be processed may be mapped into the plane coordinate system. In this way, each of the Q independent areas may correspond to a geometric center point, such that Q geometric center points may be acquired. The Q geometric center points may correspond to a target center geometric point. By determining standard deviations between the Q geometric center points and the target center geometric point, the discrete distribution degree of Q independent areas can be acquired. Therefore, the discrete distribution degree of Q independent areas may be acquired by establishing a coordinate system.

Further, determining the current environment according to the discrete distribution degree and the N shooting brightness parameters described in B2) may be implemented by: determining the current environment as the first preset environment when the discrete distribution degree is smaller than a preset discrete threshold, the exposure time is smaller than the first preset threshold and the ISO value is smaller than the second preset threshold; and determining the current environment as the second preset environment when the discrete distribution degree is greater than or equal to the preset discrete threshold, or when the exposure time is greater than or equal to the first preset threshold or when the ISO value is greater than or equal to the second preset threshold.

The preset discrete threshold may be a system default setting or may be set by the user. By determining the environment according to the discrete distribution degree, the exposure time and the ISO value, an accuracy of determining the environment may be improved.

At block 104, a light spot area of the image to be processed is determined according to the current environment.

Although it is determined a light spot area of the image to be processed, the number of light spot area of the image to be processed is not limited in the present disclosure. In some embodiments, the image to be processed may include a plurality of light spot areas, in this case, the plurality of light spot areas of the image to be processed are determined according to the current environment.

In an embodiment, determining the light spot area of the image to be processed according to the current environment at block 104 may include: determining a set of pixels each with brightness greater than a first brightness threshold in the image to be processed as the light spot area when the current environment is the first preset environment; and determining a set of pixels each with brightness greater than a second brightness threshold in the image to be processed as the light spot area when the current environment is the second preset environment, in which the first brightness threshold is greater than the second brightness threshold.

The first brightness threshold and the second brightness threshold may be system default settings or may be set by the user. The first brightness threshold is greater than the second brightness threshold. For example, the first brightness threshold may be 250, and the second brightness threshold may be 240. For another example, the first brightness threshold may be 248, and the second brightness threshold may be 242. Thus, when the current environment is the first preset environment, a set of pixels each with brightness greater than the first brightness threshold in the image to be processed may be regarded as the light spot area. When the current environment is the second preset environment, a set of pixels each with brightness greater than the second brightness threshold in the image to be processed may be regarded as the light spot area, in which the first brightness threshold is greater than the second brightness threshold. Therefore, respective light spot areas may be selected for different environments, such that the possibilities of regarding the highlighted objects as light spots and of missing some light spots may be reduced.

In an embodiment, determining the light spot area of the image to be processed according to the current environment at block 104 may include: determining a region with a mean brightness greater than a third brightness threshold in the image to be processed as the light spot area when the current environment is the first preset environment; and determining a region with a mean brightness greater than a fourth brightness threshold in the image to be processed as the light spot area when the current environment is the second preset environment, in which the third brightness threshold is greater than the fourth brightness threshold.

The third brightness threshold and the fourth brightness threshold may be system default settings or may be set by the user. The third brightness threshold is greater than the fourth brightness threshold. For example, the third brightness threshold may be 247, and the fourth brightness threshold may be 236. For another example, the third brightness threshold may be 243, and the fourth brightness threshold may be 231. Thus, when the current environment is the first preset environment, the region with the mean brightness greater than the third brightness threshold in the image to be processed may be regarded as the light spot area. When the current environment is the second preset environment, the region with the mean brightness greater than the fourth brightness threshold in the image to be processed may be regarded as the light spot area, in which the third brightness threshold is greater than the fourth brightness threshold. Therefore, respective light spot areas may be selected for different environments, such that the possibilities of regarding the highlighted objects as light spots and of missing some light spots may be reduced.

At block 105, different processing operations are performed on the light spot area and other areas of the image to be processed, so as to acquire an output image.

The image to be processed includes the area(s) to be blurred including the light spot area(s) and other areas. The other areas mean areas in the area(s) to be blurred, excluding the light spot area(s). A bokeh processing and a brightness-increased processing may be performed on the light spot area, such that the light spots may be blurred and the overall viewing effect may be improved. A background processing may be performed on the light spots by implementing embodiments of the present disclosure, such that the light spots may be blurred and the overall viewing effect may be improved. However, for other areas need to be blurred, only the bokeh processing is performed, since brightness of the object which is not a light spot needs not to be increased.

Figure 2A:
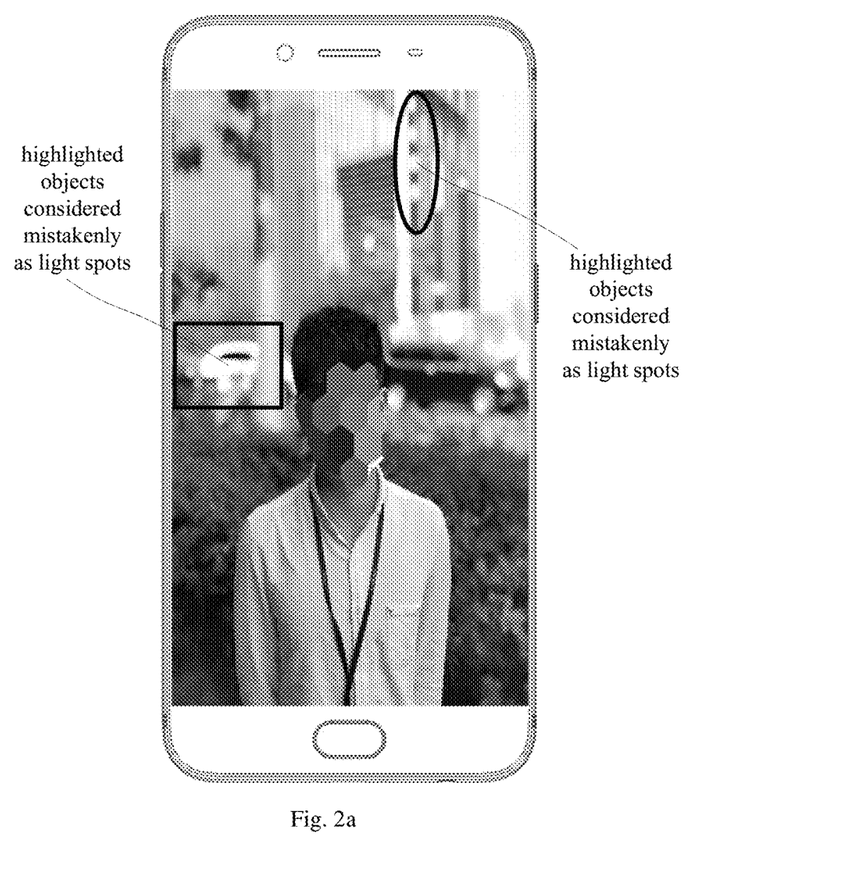
FIG. 2a is a schematic diagram of a specific scene according to an embodiment of the present disclosure.
Figure 2B:
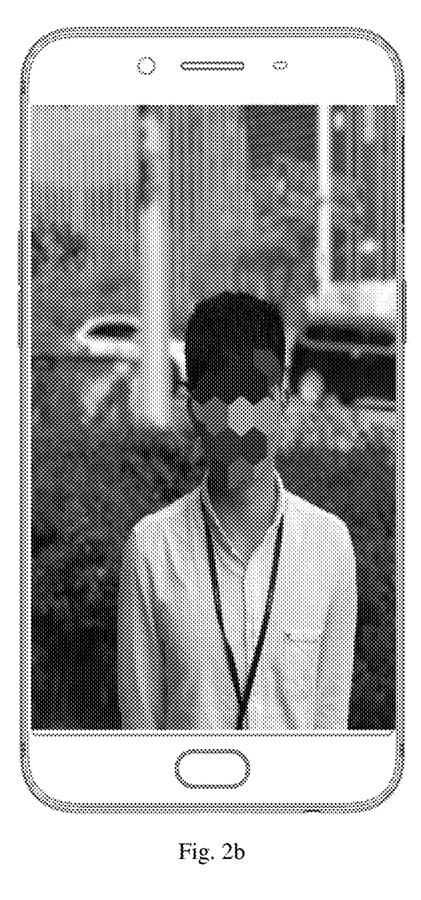
FIG. 2b is a schematic diagram of a specific scene according to an embodiment of the present disclosure.

As illustrated in FIGS. 2a-2b, FIGS. 2a and 2b illustrate comparison diagrams for a same scene. It can be seen that, since the highlighted objects are considered as light spots, there is a large area of blurry but bright area after the bokeh processing and the brightness-increased processing, leading to a poor image quality. While as illustrated in FIG. 2b, by implementing the image processing method according to embodiments of the present disclosure, the light spots are identified, such that only the light spots are subject to the bokeh processing and the brightness-increased processing and the highlighted objects are merely subject to the bokeh processing without the brightness-increased processing, thereby protecting the highlighted objects from having high brightness as the light spots. The car and the sign in FIG. 2b are clearly shown. The overall effect of FIG. 2b is better than that of FIG. 2a.

In an embodiment, performing the background bokeh processing on the light spot area at block 105 may include: performing the bokeh processing on the light spot area with a bokeh algorithm corresponding to the current environment.

Mapping relations between environments and bokeh algorithms may be set in advance. And the bokeh algorithm corresponding to the current environment may be determined according to the mapping relations. The bokeh processing may be performed on the light spot area according to the bokeh algorithm, so as to acquire the output image.

With embodiments of the present disclosure, it can be seen that, the image to be processed is acquired when shooting a picture, N shooting brightness parameters for adjusting a camera and corresponding to the shooting are acquired, where N is a positive integer. The current environment is determined according to the N shooting brightness parameters, a light spot area is of the image to be processed is determined according to the current environment; and different processing operations are performed on the light spot area and other areas of the image to be processed, so as to acquire the output image. Therefore, the environment may be determined according to the shooting brightness parameters, the light spot area may be selected according to the determining result, such that the different processing operations can be performed for the light spot area and other areas. Since the light spot area is determined in combination with specific environment, the possibility of considering the highlighted objects as the light spots may be reduced, thereby improving the displaying effect of the image.

Figure 3:
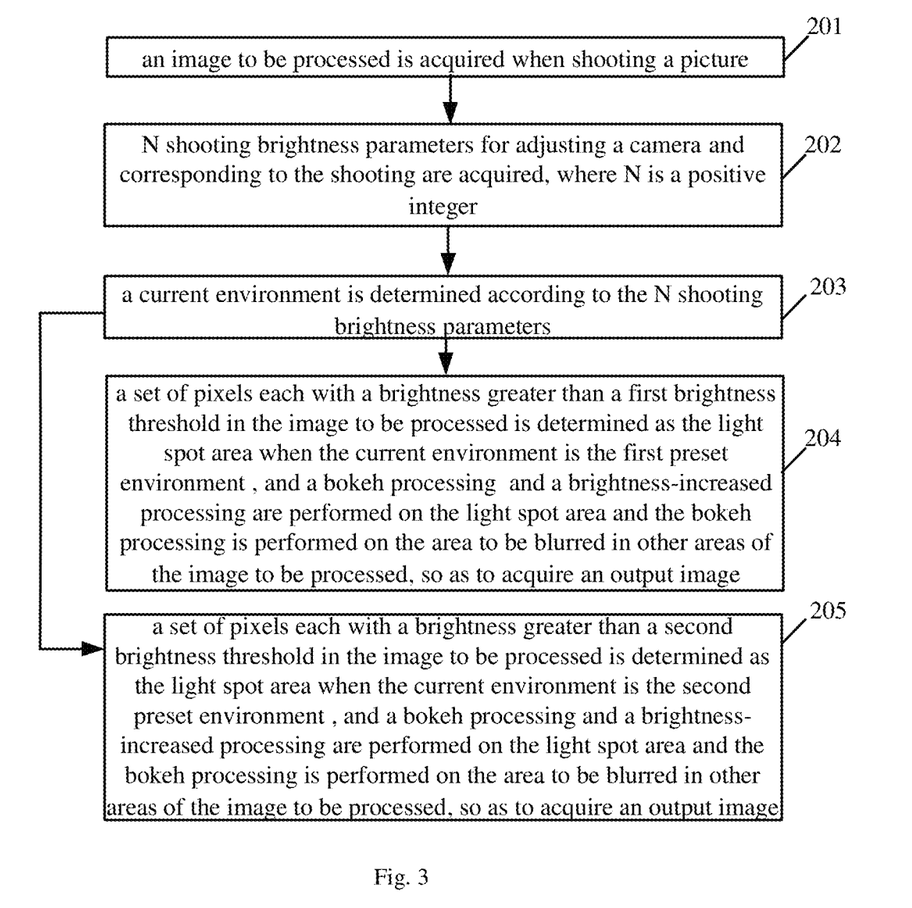
FIG. 3 schematic flow chart of an image processing method according to another embodiment of the present disclosure.

Referring to FIG. 3, FIG. 3 is a schematic flow chart of an image processing method according to another embodiment of the present disclosure. The image processing method may include the following.

At block 201, an image to be processed is acquired when shooting a picture.

At block 202, N shooting brightness parameters for adjusting a camera and corresponding to the shooting are acquired, where N is a positive integer.

At block 203, a current environment is determined according to the N shooting brightness parameters.

Regarding acts at blocks 201-203, reference may be made to corresponding acts of the image processing method described in FIG. 1.

At block 204, a set of pixels each with a brightness greater than a first brightness threshold in the image to be processed is determined as the light spot area when the current environment is a first preset environment, and a bokeh processing and a brightness-increased processing are performed on the light spot area and the bokeh processing is performed on the area to be blurred in other areas of the image to be processed, so as to acquire an output image.

As described above, the first preset environment may be a high light environment. In this case, it could be understood that the overall brightness of the image is high, thus the brightness of the light spot may be high. Accordingly, pixels each with the brightness greater than the first brightness threshold may be determined as the light spots. The first brightness threshold may be a default setting of the system or may be set by the user. For example, the first brightness threshold may be 250.

At block 205, a set of pixels each with a brightness greater than a second brightness threshold in the image to be processed is determined as the light spot area when the current environment is the second preset environment, and a bokeh processing and a brightness-increased processing are performed on the light spot area and the bokeh processing is performed on the area to be blurred in other areas of the image to be processed, so as to acquire an output image. The first brightness threshold is greater than the second brightness threshold.

As described above, the second preset environment may be a low light environment. In this case, it could be understood that the overall brightness of the image is high, thus the brightness of the light spot may be high. Accordingly, pixels each with the brightness greater than the second brightness threshold may be determined as the light spots. The second brightness threshold may be a default setting of the system or may be set by the user. For example, the second brightness threshold may be 240.

With embodiments of the present disclosure, it can be seen that, the image to be processed is acquired when shooting a picture, N shooting brightness parameters for adjusting a camera and corresponding to the shooting are acquired, where N is a positive integer. The current environment is determined according to the N shooting brightness parameters, when the current environment is the first preset environment, the set of pixels each with the brightness greater than the first brightness threshold in the image to be processed can be configured as the light spot area, and a bokeh processing and a brightness-increased processing are performed on the light spot area and the bokeh processing is performed on the area to be blurred in other areas of the image to be processed so as to acquire an output image; when the current environment is the second preset environment, the set of pixels each with the brightness greater than the second brightness threshold in the image to be processed can be configured as the light spot area, and a bokeh processing and a brightness-increased processing are performed on the light spot area and the bokeh processing is performed on the area to be blurred in other areas of the image to be processed so as to acquire an output image. The first brightness threshold is greater than the second brightness threshold. Therefore, by determining the environment according to the shooting brightness parameters and determining the light spot area according to the determining result, different processing operations can be performed on the light spot area and other areas of the image to be processed. Since the light spot area is determined in combination with specific environment, the light spot area can be determined in different manners for the high light environment and the low light environment, such that the possibility of considering the highlighted objects as the light spots may be reduced, thereby improving the displaying effect of the image.

Figure 4:
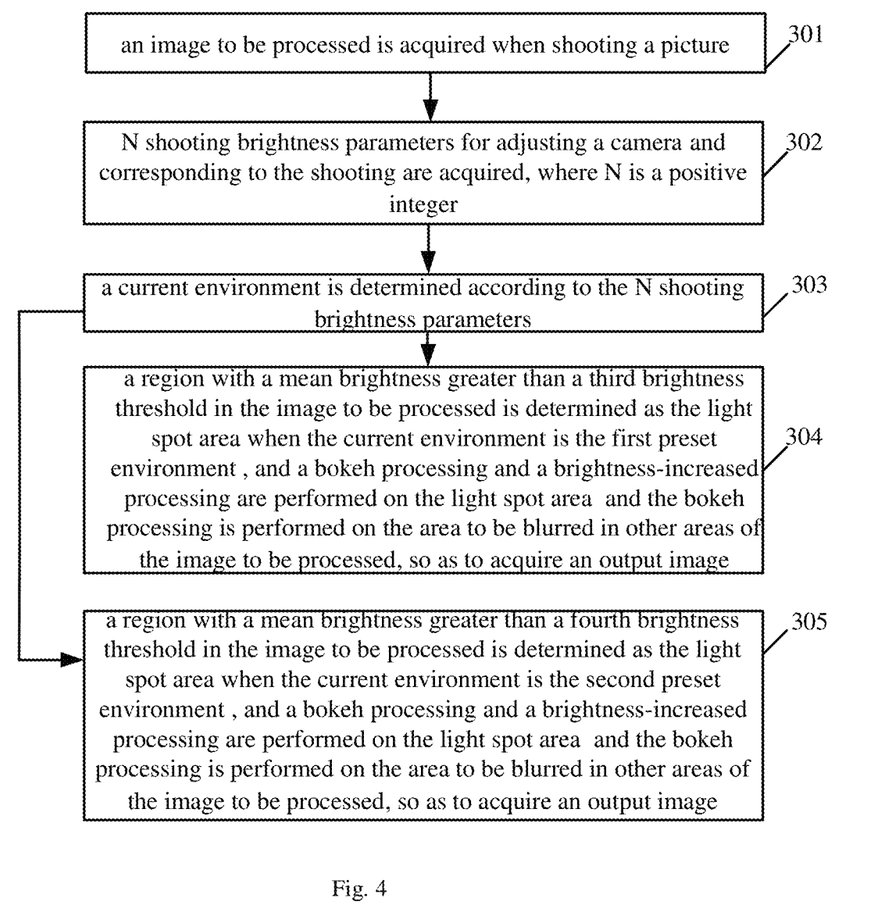
FIG. 4 is schematic flow chart of an image processing method according to yet another embodiment of the present disclosure.

Referring to FIG. 4, FIG. 4 is schematic flow chart of an image processing method according to yet another embodiment of the present disclosure. The image processing method may include the following.

At block 301, an image to be processed is acquired when shooting a picture.

At block 302, N shooting brightness parameters for adjusting a camera and corresponding to the shooting are acquired, where N is a positive integer.

At block 303, a current environment is determined according to the N shooting brightness parameters.

Regarding acts at blocks 301-303, reference may be made to corresponding acts of the image processing method described in FIG. 1.

At block 304, a region with a mean brightness greater than a third brightness threshold in the image to be processed is determined as the light spot area when the current environment is a first preset environment, and a bokeh processing and a brightness-increased processing are performed on the light spot area and the bokeh processing is performed on the area to be blurred in other areas of the image to be processed, so as to acquire an output image.

As described above, the first preset environment may be a high light environment. In this case, it could be understood that the overall brightness of the image is high, and the brightness of the light spot may be high. Thus, the region with the mean brightness greater than the third brightness threshold may be determined as the light spots. The third brightness threshold may be a default setting of the system or may be set by the user. For example, the third brightness threshold may be 247.

At block 305, a region with a mean brightness greater than a fourth brightness threshold in the image to be processed is determined as the light spot area when the current environment is a second preset environment, and a bokeh processing and a brightness-increased processing are performed on the light spot area and the bokeh processing is performed on the area to be blurred in other areas of the image to be processed, so as to acquire an output image. The third brightness threshold is greater than the fourth brightness threshold.

As described above, the fourth preset environment may be a low light environment. In this case, it could be understood that the overall brightness of the image is high, and the brightness of the light spot may be high. Thus, the region with the mean brightness greater than the fourth brightness threshold may be determined as the light spots. The fourth brightness threshold may be a default setting of the system or may be set by the user. For example, the fourth brightness threshold may be 236.

With embodiments of the present disclosure, it can be seen that, the image to be processed is acquired when shooting a picture, N shooting brightness parameters for adjusting a camera and corresponding to the shooting are acquired, where N is a positive integer. The current environment is determined according to the N shooting brightness parameters, when the current environment is the first preset environment, the region with the mean brightness greater than the third brightness threshold in the image to be processed can be configured as the light spot area, and a bokeh processing and a brightness-increased processing are performed on the light spot area and the bokeh processing is performed on the area to be blurred in other areas of the image to be processed so as to acquire an output image; when the current environment is the second preset environment, the region with the mean brightness greater than the fourth brightness threshold in the image to be processed can be configured as the light spot area, and a bokeh processing and a brightness-increased processing are performed on the light spot area and the bokeh processing is performed on the area to be blurred in other areas of the image to be processed so as to acquire an output image. The third brightness threshold is greater than the fourth brightness threshold. Therefore, by determining the environment according to the shooting brightness parameters and determining the light spot area according to the determining result, different processing operations can be performed on the light spot area and other areas of the image to be processed. Since the light spot area is selected in combination with specific environment, the light spot area can be determined in different manners for the high light environment and the low light environment, such that the possibility of considering the highlighted objects as the light spots may be reduced, thereby improving the displaying effect of the image.

Corresponding to the above description, embodiments of an image processing apparatus will be described as follows.

Figure 5A:
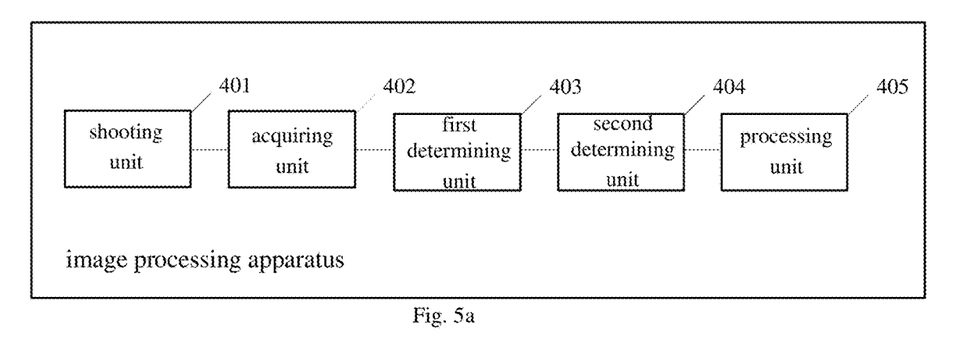
FIG. 5a is a block diagram of an image processing apparatus according to an embodiment of the present disclosure.

Referring to FIG. 5a, FIG. 5a is a block diagram of an image processing apparatus according to an embodiment of the present disclosure. The image processing apparatus may include a shooting unit 401, an acquiring unit 402, a first determining unit 403, a second determining unit 404 and a processing unit 405.

The shooting unit 401 is configured to acquire an image to be processed when shooting a picture.

The acquiring unit 402 is configured to acquire N shooting brightness parameters for adjusting a camera and corresponding to the shooting, where N is a positive integer.

The first determining unit 403 is configured to determine a current environment according to the N shooting brightness parameters.

The second determining unit 404 is configured to determine a light spot area of the image to be processed according to the current environment.

The processing unit 405 is configured to perform different processing operations on the light spot area and other areas of the image to be processed, so as to acquire an output image.

In an embodiment, the N shooting brightness parameters include an exposure time and an ISO value.

The first determining unit 403 is further configured to determine the current environment as a first preset environment when the exposure time is smaller than a first preset threshold and the ISO value is smaller than a second preset threshold; and to determine the current environment as a second preset environment when the exposure time is greater than or equal to the first preset threshold or when the ISO value is greater than or equal to the second preset threshold.

Figure 5B:
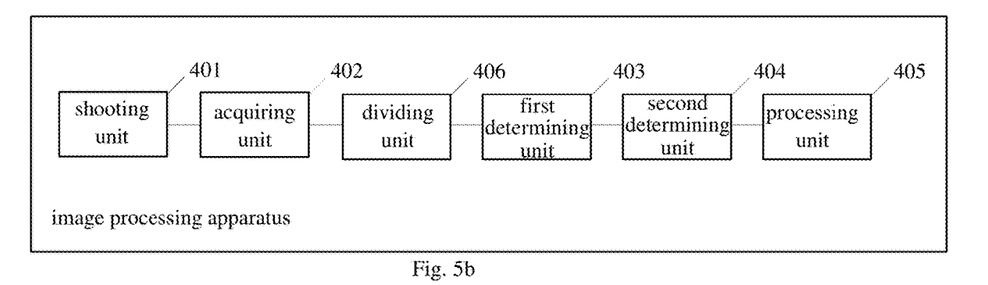
FIG. 5b is a block diagram of an image processing apparatus described in FIG. 5a according to an embodiment of the present disclosure.

In an embodiment, as illustrated in FIG. 5b, FIG. 5b is a block diagram illustrating a modification of an image processing apparatus described in FIG. 5a. The image processing apparatus may further include a dividing unit 406. The dividing unit 406 is configured to divide the image to be processed into P independent areas, and to select Q independent areas from the P independent areas. A mean brightness of each of the Q independent areas is greater than a preset mean brightness. P and Q are positive integers and P is greater than Q.

The first determining unit 403 may be further configured to determine a discrete distribution degree of the Q independent areas in the image to be processed; and to determine the current environment according to the discrete distribution degree of the Q independent areas and the N shooting brightness parameters.

In an embodiment, the second determining unit 404 may be further configured to determine a set of pixels each with a brightness greater than a first brightness threshold in the image to be processed as the light spot area when the current environment is the first preset environment; and to determine a set of pixels each with a brightness greater than a second brightness threshold in the image to be processed as the light spot area when the current environment is the second preset environment, in which the first brightness threshold is greater than the second brightness threshold.

In an embodiment, the second determining unit 404 may be further configured to determine a region with a mean brightness greater than a third brightness threshold in the image to be processed as the light spot area when the current environment is the first preset environment; and to determine a region with a mean brightness greater than a fourth brightness threshold in the image to be processed as the light spot area when the current environment is the second preset environment, in which the third brightness threshold is greater than the fourth brightness threshold.

With image processing apparatus according to embodiments of the present disclosure, it can be seen that, the image to be processed is acquired when shooting a picture, N shooting brightness parameters for adjusting a camera and corresponding to the shooting are acquired, where N is a positive integer. The current environment is determined according to the N shooting brightness parameters, the light spot area of the image to be processed is determined according to the current environment. A bokeh processing and a brightness-increased processing are performed on the light spot area and the bokeh processing is performed on the area to be blurred in other areas of the image to be processed, so as to acquire an output image. Therefore, by determining the environment according to the shooting brightness parameters and determining the light spot area according to the determining result, different processing operations can be performed on the light spot area. Since the light spot area is selected in combination with specific environment, the possibility of considering the highlighted objects as the light spots may be reduced, thereby improving the displaying effect of the image.

It should be understood that functions of units in the image processing apparatus embodiments may be implemented by the image processing method according to embodiments of the present disclosure. Regarding the specific implementations of the above-mentioned units, reference may be made to the description of relative acts in the method embodiments, which will not be described in detail herein.

Figure 6:
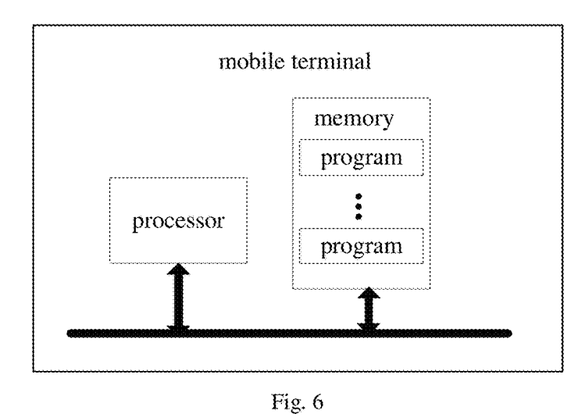
FIG. 6 is a block diagram of a mobile terminal according to an embodiment of the present disclosure.

Referring to FIG. 6, FIG. 6 is a block diagram of a mobile terminal according to an embodiment of the present disclosure. The mobile terminal may include an application processor, a memory and one or more programs stored on the memory and configured to be executed by the processor. The one or more programs include instructions for performing following acts: acquiring an image to be processed when shooting a picture; acquiring N shooting brightness parameters for adjusting a camera and corresponding to the shooting, where N is a positive integer; determining a current environment according to the N shooting brightness parameters; determining a light spot area of the image to be processed according to the current environment; and performing different processing operations on the light spot area and other areas of the image to be processed, so as to acquire an output image.

In a possible example, the N shooting brightness parameters include an exposure time and an ISO value. With respect to an aspect of determining the current environment according to the N shooting brightness parameters, the one or more programs may further include instructions for performing following acts: determining the current environment as a first preset environment when the exposure time is smaller than a first preset threshold and the ISO value is smaller than a second preset threshold; and determining the current environment as a second preset environment when the exposure time is greater than or equal to the first preset threshold or when the ISO value is greater than or equal to the second preset threshold.

In a possible example, the one or more programs may include instructions for performing following acts: dividing the image to be processed into P independent areas, and selecting Q independent areas from the P independent areas, in which a mean brightness of each of the Q independent areas is greater than a preset mean brightness, where P and Q are positive integers and P is greater than Q. With respect to an aspect of determining the current environment according to the N shooting brightness parameters, the one or more programs may further include instructions for performing following acts: determining a discrete distribution degree of the Q independent areas in the image to be processed; and determining the current environment according to the discrete distribution degree of the Q independent areas and the N shooting brightness parameters.

In a possible example, with respect to an aspect of determining a light spot area of the image to be processed according to the current environment, the one or more programs may further include instructions for performing following acts: determining a set of pixels each with a brightness greater than a first brightness threshold in the image to be processed as the light spot area when the current environment is the first preset environment; and determining a set of pixels each with a brightness greater than a second brightness threshold in the image to be processed as the light spot area when the current environment is the second preset environment, in which the first brightness threshold is greater than the second brightness threshold.

In a possible example, with respect to an aspect of determining a light spot area of the image to be processed according to the current environment, the one or more programs may further include instructions for performing following acts: determining a region with a mean brightness greater than a third brightness threshold in the image to be processed as the light spot area when the current environment is the first preset environment; and determining a region with a mean brightness greater than a fourth brightness threshold in the image to be processed as the light spot area when the current environment is the second preset environment, in which the third brightness threshold is greater than the fourth brightness threshold.

Figure 7:
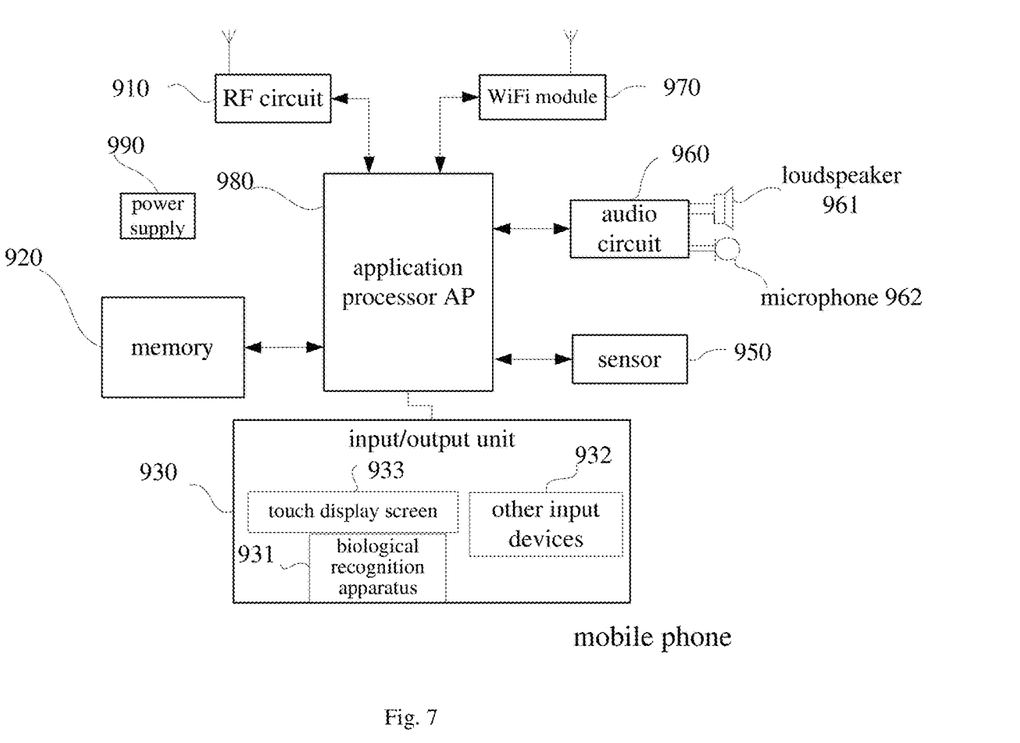
FIG. 7 is a structure diagram of a mobile phone according to an embodiment of the present disclosure.

Embodiments of the present disclosure also provide another mobile terminal, as illustrated in FIG. 7. For convenience of description, parts relative with embodiments of the present disclosure are illustrated only. Regarding specific technical details which are not disclosed, reference can be made to the description of the method embodiments. The mobile terminal may include a mobile phone, a tablet computer, a personal digital assistant (PDA), a point of sales (POS), a vehicle-mounted computer and the like. The present disclosure takes the mobile phone as an example.

FIG. 7 illustrates a structure diagram of a mobile phone related to the mobile terminal provided by embodiments of the present disclosure. Referring to FIG. 7, the mobile phone may include a radio frequency (RF) circuit 910, a memory 920, an input unit 930, a sensor 950, an audio circuit 960, a wireless fidelity (WiFi) module 970, a processor 980, a power supply 990 and the like. It will be understood by those skilled in the art that the terminal structure shown in FIG. 7 does not constitute a limitation on the mobile phone. The mobile phone may include less or more components than those illustrated in FIG. 7 or combinations thereof, or have a different arrangement of components.

Respective components of the mobile phone will be described in detail with reference to FIG. 7.

The input unit 930 may be configured to receive input digital or character information, and a key signal input related to user setup and functional control of the mobile phone. In detail, the input unit 930 may include a touch display screen 933, a biological recognition apparatus 931 and other input devices 932. The biological recognition apparatus 931 is coupled to the touch display screen 933, and the biological recognition apparatus 931 may be a fingerprint recognition apparatus, or human face recognition apparatus or an iris recognition apparatus. The input unit 930 may also include other input devices 932. In detail, other input devices 932 may include but are not be limited to one or more of a physical button, a functional button (such as a volume control button, an ON-OFF button and the like), a trackball, a mouse and a joystick. The processor 980 is configured to acquire an image to be processed when shooting a picture; to acquire N shooting brightness parameters for adjusting a camera and corresponding to the shooting, where N is a positive integer; to determine a current environment according to the N shooting brightness parameters; to determine a light spot area of the image to be processed according to the current environment; and to perform different processing operations on the light spot area and other areas of the image to be processed, so as to acquire an output image.

The processor 980 is a control center of the mobile phone, which uses various interfaces and wiles to couple respective parts of the mobile phone. By running or executing software programs and/or modules stored in the memory 920 and invoking data stored in the memory 920, various functions and data processing of the mobile phone may be performed, so as to monitor the mobile phone overall. Alternatively, the processor 980 may include one or more processing units. Preferably, the processor 980 may integrate an application processor and a modem processor, in which the application processor is mainly configured to process the operating system, the user interface and applications, and the modem processor is mainly configured to process wireless communication. It could be understood that the above-described modem processor may be not integrated in the processor 980.

In addition, the memory 920 may include a high speed random access memory and may include a non-transitory medium, such as at least one disk storage element, a flash storage element or other transitory solid state storage element.

The RF circuit 910 may be configured to receive and send information. Generally, the RF circuit 910 includes, but is not limited to, an antenna, at least one amplifier, a transceiver, a coupler, a low noise amplifier (LNA), and a duplexer. In addition, the RF circuit 910 may also communicate with another device by a network and wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The mobile phone may also include at least one sensor 950, such as an optical sensor, a motion sensor, and other sensors. In detail, the optical sensor may include an ambient light sensor and a proximity sensor. The ambient light sensor can adjust luminance of the touch display screen according to brightness of the ambient light. The proximity sensor may switch off the touch display screen and/or backlight when the mobile phone is moved to the ear. As one type of motion sensor, an acceleration sensor may be enumerated. The acceleration sensor can detect accelerations in various directions (generally on three axes), may detect magnitude and a direction of the gravity when the mobile phone is static. The acceleration sensor may be used in recognizing the posture of the mobile phone (for example, landscape/portrait screen switching, a related game, and magnetometer posture calibration), vibration recognition related functions (such as a pedometer and percussion), and the like. Other sensors, such as a gyroscope, a barometer, a hygrometer, a thermometer, and an infrared sensor can be configured on the mobile phone, which are not further described herein.

The audio circuit 960, a loudspeaker 961, and a microphone 962 may provide audio interfaces between the user and the mobile phone. The audio circuit 960 may convert received audio data into an electric signal and transmit the electric signal to the loudspeaker 961. The loudspeaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processed audio data may be sent to, for example, another phone by using the radio frequency circuit 910, or be outputted to the memory 920 for further processing.

WiFi is a short distance wireless transmission technology. The mobile phone may help, by using the WiFi module 970, the user to receive and send e-mails, browse a webpage, access streaming media, and so on, which provides wireless broadband Internet access service for the user. Although the WiFi module 970 is illustrated in FIG. 7, it could be understood that the WiFi module is not essential for the phone and can be omitted when required, as long as the scope of the essence of the present disclosure is not changed.

The mobile phone further includes the power supply 990 (such as a battery) for supplying power to the components. Preferably, the power supply may be logically coupled with the processor 980 by using a power management system, thereby implementing functions such as charging, discharging and power consumption management by using the power management system.

Although not shown, the mobile phone may further include a camera, a Bluetooth module, and the like, which is not further described herein.

In aforementioned embodiments of FIGS. 1-3, method steps may be realized based on the structure of the mobile phone.

In aforementioned embodiments of FIGS. 4-5, functions of the units may be realized based on the structure of the mobile phone.

Embodiments of the present disclosure also provide a computer storage medium having computer programs for exchanging digital data stored thereon, in which the computer programs are executed to cause a computer to perform all or a part of acts of the image processing method according to the method embodiments of the present disclosure.

Embodiments of the present disclosure also provide a computer program product including a non-transitory computer-readable storage medium storing computer programs, in which the computer programs are executed to cause a computer to perform all or a part of acts of the image processing method according to the method embodiments of the present disclosure.

It should be noted that, for convenience and simplicity of description, the above method embodiments are described in a form of a combination of a series of steps. However, those skilled in the art can understand clearly that, the present disclosure is not limited by the order of the steps, since some steps according to present disclosure may be performed simultaneously or in other orders. In addition, those skilled in the art can understand clearly that, the described embodiments are preferred embodiments, of which relative steps or modules may be unnecessary for the present disclosure.

In above embodiments, each embodiment may be described focusing on different aspects. Parts not be described in some embodiments may refer to relative descriptions in other embodiments.

It should be understood that, the image processing apparatus disclosed in several embodiments provided by the present disclosure can be realized in any other manner. For example, the device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

It should be understood that all or a part of the method provided by the present disclosure may be realized by programs instructing relative hardware, the programs may be stored in a computer-readable memory. The memory may include a flash disk, an ROM, an RAM, a magnet disk, a light disk and the like.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. An image processing method, comprising:
acquiring an image to be processed when shooting a picture;
acquiring N shooting brightness parameters for adjusting a camera and corresponding to the shooting, where N is a positive integer;
dividing the image to be processed into P independent areas, and selecting Q independent areas from the P independent areas, wherein a mean brightness of each of the Q independent areas is greater than a preset mean brightness, where P and Q are positive integers and P is greater than Q;
determining a current environment according to the N shooting brightness parameters, comprising: determining a discrete distribution degree of the Q independent areas in the image to be processed and determining the current environment according to the discrete distribution degree of the Q independent areas and the N shooting brightness parameters;
determining a light spot area of the image to be processed according to the current environment; and
performing different processing operations on the light spot area and other areas of the image to be processed, so as to acquire an output image.

2. The image processing method according to claim 1, wherein performing different processing operations on the light spot area and other areas of the image to be processed comprises:
performing a bokeh processing and a brightness-increased processing on the light spot area; and
performing the bokeh processing on an area to be blurred in other areas of the image to be processed.

3. The image processing method according to claim 2, wherein performing the bokeh processing on the light spot area comprises:
performing the bokeh processing on the light spot area with a bokeh algorithm corresponding to the current environment.

4. The image processing method according to claim 1, wherein determining a discrete distribution degree of the Q independent areas in the image to be processed comprises:
mapping the image to be processed into a plane coordinate system according to a preset manner, selecting a geometric center of each of the Q independent areas so as to acquire Q geometric center points;
acquiring a geometric center of the Q geometric center points so as to acquire a target center geometric point; and
determining standard deviations between the Q geometric center points and the target center geometric point so as to acquire the discrete distribution degree.

5. The image processing method according to claim 1, wherein the N shooting brightness parameters comprise an exposure time and an ISO value, wherein determining the current environment according to the discrete distribution degree of the Q independent areas and the N shooting brightness parameters comprises:
determining the current environment as a first preset environment when the discrete distribution degree is smaller than a preset discrete threshold, the exposure time is smaller than a first preset threshold and the ISO value is smaller than a second preset threshold; and
determining the current environment as a second preset environment when the discrete distribution degree is greater than or equal to the preset discrete threshold, or when the exposure time is greater than or equal to the first preset threshold or when the ISO value is greater than or equal to the second preset threshold.

6. The image processing method according to claim 5, wherein determining the light spot area of the image to be processed according to the current environment comprises:
determining a set of pixels each with a brightness greater than a first brightness threshold in the image to be processed as the light spot area when the current environment is the first preset environment; and
determining a set of pixels each with a brightness greater than a second brightness threshold in the image to be processed as the light spot area when the current environment is the second preset environment, in which the first brightness threshold is greater than the second brightness threshold.

7. The image processing method according to claim 5, wherein determining the light spot area of the image to be processed according to the current environment comprises:
determining a region with a mean brightness greater than a third brightness threshold in the image to be processed as the light spot area when the current environment is the first preset environment; and
determining a region with a mean brightness greater than a fourth brightness threshold in the image to be processed as the light spot area when the current environment is the second preset environment, in which the third brightness threshold is greater than the fourth brightness threshold.

8. An image processing apparatus, comprises a non-transitory computer-readable medium comprising computer-executable instructions stored thereon, and an instruction execution system which is configured by the instructions to implement:
a shooting unit, configured to acquire an image to be processed when shooting a picture;
an acquiring unit, configured to acquire N shooting brightness parameters for adjusting a camera and corresponding to the shooting, where N is a positive integer;
a dividing unit, configured to divide the image to be processed into P independent areas, and to select Q independent areas from the P independent areas, wherein a mean brightness of each of the Q independent areas is greater than a preset mean brightness, where P and Q are positive integers and P is greater than Q;
a first determining unit, configured to determine a current environment according to the N shooting brightness parameters by determining a discrete distribution degree of the Q independent areas in the image to be processed and determining the current environment according to the discrete distribution degree of the Q independent areas and the N shooting brightness parameters;
a second determining unit, configured to determine a light spot area of the image to be processed according to the current environment; and
a processing unit, configured to perform different processing operations on the light spot area and other areas of the image to be processed, so as to acquire an output image.

9. The image processing apparatus according to claim 8, wherein the performing unit is further configured to:
perform a bokeh processing and a brightness-increased processing on the light spot area; and
perform the bokeh processing on an area to be blurred in other areas of the image to be processed.

10. The image processing apparatus according to claim 8, wherein the first determining unit is further configured to determine a discrete distribution degree of the Q independent areas in the image to be processed by:
mapping the image to be processed into a plane coordinate system according to a preset manner, selecting a geometric center of each of the Q independent areas so as to acquire Q geometric center points;
acquiring a geometric center of the Q geometric center points so as to acquire a target center geometric point; and
determining standard deviations between the Q geometric center points and the target center geometric point so as to acquire the discrete distribution degree.

11. The image processing apparatus according to claim 8, wherein the N shooting brightness parameters comprise an exposure time and an ISO value, wherein the first determining unit is further configured to:

determine the current environment as the first preset environment when the discrete distribution degree is smaller than a preset discrete threshold, the exposure time is smaller than a first preset threshold and the ISO value is smaller than a second preset threshold; and determine the current environment as the second preset environment when the discrete distribution degree is greater than or equal to the preset discrete threshold, or when the exposure time is greater than or equal to the first preset threshold or when the ISO value is greater than or equal to the second preset threshold.

12. The image processing apparatus according to claim 11, wherein the second determining unit is further configured to:

determine a set of pixels each with a brightness greater than a first brightness threshold in the image to be processed as the light spot area when the current environment is the first preset environment; and determine a set of pixels each with a brightness greater than a second brightness threshold in the image to be processed as the light spot area when the current environment is the second preset environment, in which the first brightness threshold is greater than the second brightness threshold.

13. The image processing apparatus according to claim 11, wherein the second determining unit is further configured to:

determine a region with a mean brightness greater than a third brightness threshold in the image to be processed as the light spot area when the current environment is the first preset environment; and determine a region with a mean brightness greater than a fourth brightness threshold in the image to be processed as the light spot area when the current environment is the second preset environment, in which the third brightness threshold is greater than the fourth brightness threshold.

14. A mobile terminal, comprising a processor, a memory and one or more programs stored on the memory, when the one or more programs are executed by the processor, the one or more programs are configured to perform the image processing method, including:

acquiring an image to be processed when shooting a picture;

acquiring N shooting brightness parameters for adjusting a camera and corresponding to the shooting, where N is a positive integer;

dividing the image to be processed into P independent areas, and selecting Q independent areas from the P independent areas, wherein a mean brightness of each of the Q independent areas is greater than a preset mean brightness, where P and Q are positive integers and P is greater than Q;

determining a current environment according to the N shooting brightness parameters, comprising: determining a discrete distribution degree of the Q independent areas in the image to be processed and determining the current environment according to the discrete distribution degree of the Q independent areas and the N shooting brightness parameters;

determining a light spot area of the image to be processed according to the current environment; and performing different processing operations on the light spot area and other areas of the image to be processed, so as to acquire an output image.

\* \* \* \* \*